(12) United States Patent
Günther et al.

(10) Patent No.: US 6,732,213 B1
(45) Date of Patent: May 4, 2004

(54) MULTIPLE PROCESSOR COMPUTER

(75) Inventors: Heinz Günther, Kirchheim (DE);
Reinhold Hofer, Olching (DE); Ralf Berberich, Unterhaching (DE); Felix Schmidt, Ottobrunn (DE); Karsten Kurpiers, Oberpframmern (DE)

(73) Assignee: Force Computers GmbH, Neubiberg (DE)

( * ) Notice: Subject to any disclaimer, the term of this patent is extended or adjusted under 35 U.S.C. 154(b) by 0 days.

(21) Appl. No.: 09/496,392

(22) Filed: Feb. 2, 2000

(30) Foreign Application Priority Data

Feb. 2, 1999 (DE) ........................................ 199 04 084

(51) Int. Cl.[7] .............................................. G06F 13/14
(52) U.S. Cl. ......................... 710/305; 710/300; 710/52
(58) Field of Search ................................. 710/300, 305, 710/52–57

(56) References Cited

U.S. PATENT DOCUMENTS

| | | | | |
|---|---|---|---|---|
| 5,083,269 A | | 1/1992 | Syobatake et al. | |
| 5,347,514 A | * | 9/1994 | Davis et al. | 370/429 |
| 5,502,833 A | * | 3/1996 | Byrn et al. | 710/240 |
| 5,600,820 A | | 2/1997 | Johnston | |
| 5,905,905 A | * | 5/1999 | Dailey et al. | 710/5 |
| 6,078,565 A | * | 6/2000 | Ben-Michael et al. | 370/236 |

FOREIGN PATENT DOCUMENTS

| | | |
|---|---|---|
| EP | 0674276 A1 | 9/1995 |
| EP | 0834816 A2 | 4/1998 |

* cited by examiner

*Primary Examiner*—Sumati Lefkowitz
(74) *Attorney, Agent, or Firm*—Thelen Reid & Priest LLP; Robert E. Krebs

(57) ABSTRACT

A computer is provided that has a plurality of insertion cards that are interconnected via a bus. One insertion card includes a local processing unit and a first intermediate memory for intermediate storage of messages intended for the local processing unit, and a second intermediate memory for intermediate storage of messages originating from the local processing unit. A third intermediate memory and a fourth intermediate memory are provided for free message locations that are intended for or originate from the local processing unit. The second and the third intermediate memories are each provided with a respective intermediate memory extension in a local memory of the local processing unit.

17 Claims, 2 Drawing Sheets

MULTIPLE PROCESSOR COMPUTER

BACKGROUND OF THE INVENTION

The present invention relates to a computer that comprises a plurality of insertion cards or chips that are interconnected via a bus, wherein one insertion card includes a local processing unit and a first intermediate memory for intermediate storage of messages intended for the local processing unit, and a second intermediate memory for intermediate storage of messages originating from the local processing unit, wherein a third intermediate memory and a fourth intermediate memory are provided for free message locations that are intended for or originate from the local processing unit.

A computer having a plurality of local processing units is known from EP-A2-834 816, where the data transmission is effected via interface switching circuits that also take care of the assignment of the buses as operating means.

In many instances, however, it is necessary to transmit messages as data packets from one local processing unit to others, or from one local processing unit to the host or from the host to the local processing unit. A process for the transmission of data packets is known, for example, from EP-A2-817 095. With this process, the bus band width is to be increased in a multi processor system. For this purpose, additional bi-directional point-to-point connections of the individual local processing units are established. In addition, so-called repeaters are provided that make the appropriate messages accessible on the bus of all local processing units. Messages originating from one local processing unit are intermediately stored in an intermediate memory, while messages that are to be processed are conveyed directly to the local processing unit. In this connection, however, special precautions must be undertaken to ensure that the local processing unit, or possibly even the host, that sends the message does not become blocked due to errors during the acceptance of the message.

It has also already been proposed to limit the number of messages such that no overflow can take place. For this purpose, a list of free message locations is maintained, and a message can then be transmitted only if the number of cycling message records in the system are reduced by one. With this resolution, consistency with regard to the number of messages can be established.

It is also known to provide for respective intermediate storage of the messages and the free message locations in order to prevent blockage if a local processing unit is not immediately in a position to process an arriving free message location or an arriving message. This is particularly applicable if the intermediate memory or memories are realized in an integrated switching circuit, such as an ASIC, which although it enables a rapid triggering, the processing of the intermediate stored messages or the free message locations is effected in a non-synchronous manner, for example on a lower interrupt plane.

It is therefore an object of the present invention to provide a computer of the aforementioned general type that is particularly suitable for the exchange of messages between local processing units if the workload of the local processing units differs, without the danger arising that the overall capacity of the computer will be reduced by non-processed messages.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
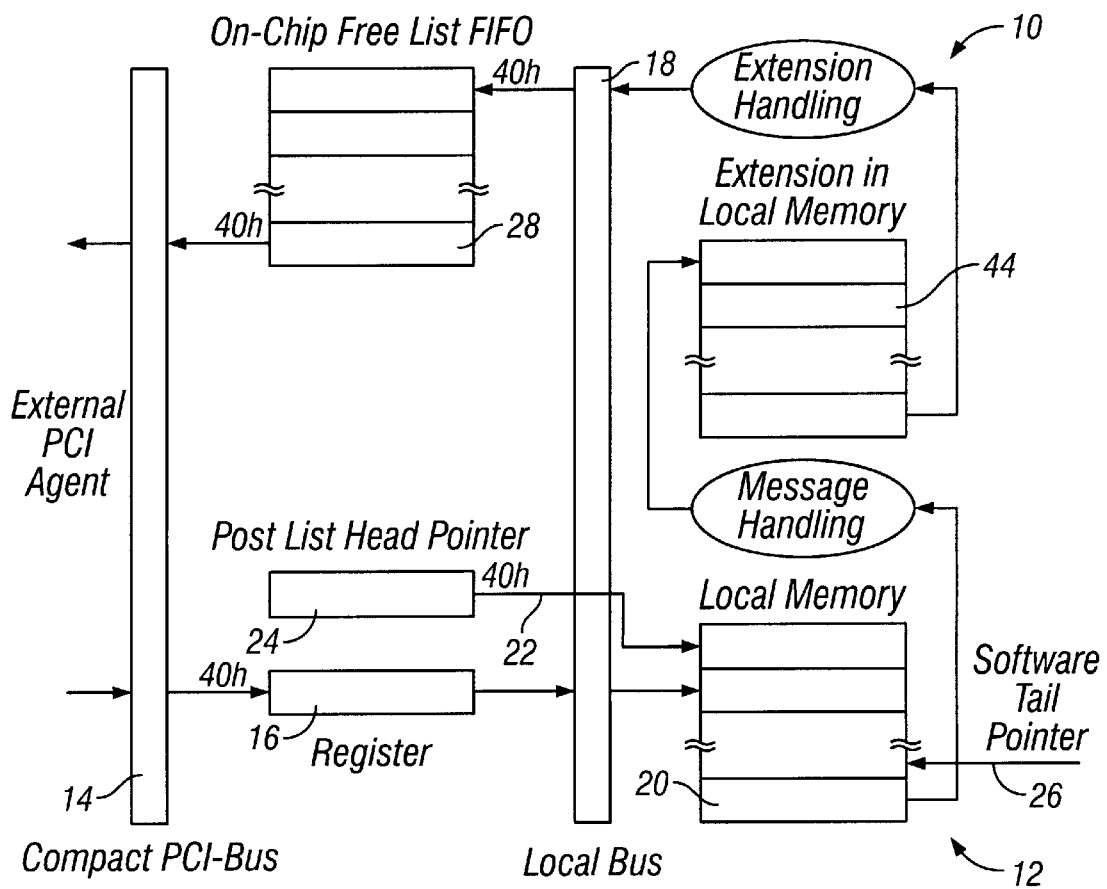
FIG. 1 illustrates a portion of one exemplary embodiment of an inventive computer, namely that portion that is intended for the intermediate storage of free message locations that are intended for the local processing unit.

The computer of the present invention is characterized primarily in that the second intermediate memory and the third intermediate memory are each provided with a respective intermediate memory extension in a local memory of the local processing unit.

Pursuant to the present invention, it is particularly expedient that of the four intermediate memories of a local processing unit, two are provided with an intermediate memory extension. These are the intermediate memory that is intended for the intermediate storage of messages that originate from the local processing unit, as well as the intermediate memory that is intended for the intermediate storage of free message locations that are intended for the local processing unit.

It is particularly expedient that the intermediate memory extension can be provided in the local memory of the local processing unit. This can also be maintained in a non-synchronous manner in that a head pointer indicates the beginning of the intermediate memory extension, and a tail pointer indicates the end of the intermediate memory extension. In contrast to the intermediate memory that is generally embodied as a register, the intermediate memory extension in the local memory thus has a nearly unlimited magnitude; it is in particular also possible to cyclically shift the two mentioned pointers so that they can cyclically migrate in an address space of, for example, 64KB, and an overflow basically would only indicate an overriding of possibly oldest messages.

Pursuant to the present invention it is therefore particularly advantageous to drastically reduce the requirements on the realtime processing of the local processing unit as seen from the rest of the computer system. To this extent an independence from the operating system is given, and the local processing unit can be made more flexible. Pursuant to the present invention it is also no longer possible that a software error, for example in the operating system of the local processing unit, would block the entire computer, and hence the hardware. Pursuant to the present invention there are always adequate message locations and messages available at those locations that are not under the control of the local processing unit, in other words, in the region of the intermediate memory of the messages intended for it and of the free message locations that are made available by it.

Pursuant to one particularly expedient specific embodiment of the inventive computer, the inventive intermediate memories operate according to the first-in-first-out principle. The appropriate intermediate memories are provided in the ASIC of the local processing unit, and the two memory extensions are provided in the local memory of the local processing unit. Two additional registers in the ASIC store the head pointers, and a register stores the magnitude of the intermediate memory extension. The magnitude is preferably a power of two, and the start address of the intermediate memory, which is externally controllable, must be coordinated with the intermediate memory magnitude in order to keep the hardware expense as low as possible.

Pursuant to a further, particularly expedient point of view, it is provided that the inventive intermediate memory, especially if a PCI bus is used as a bus system, is also suitable for the direct storage access (DMA). The transmission of messages can be effected via writing cycles, whereby in the most favorable situation even a plurality of messages can be transmitted in a single operation (burst mode). Merely one PCI read access on the head pointer register per interrupt is necessary, so that the message transmission can be effected via only a very small system load.

Due to the large intermediate memory at the decisive locations, it is no longer necessary to trigger an interrupt for every message. Rather, if desired the software can take care of the retrieval of the free message location or the writing of the message at a favorable point in time, for example in that a very low prior interrupt plane is selected.

Further specific features of the present invention will be described in detail subsequently.

DESCRIPTION OF PREFERRED EMBODIMENTS

Referring now to the drawing in detail, the illustrated exemplary embodiment of an inventive computer 10 has a Local processing unit 12 that is connected to a Bus 14, which is embodied, for example, as a compact PCI. Each Local processing unit 12 is provided on a non-illustrated insert card, and numerous insert cards can be inserted into a back plane depending upon the selection of the user.

Provided between the Bus 14 and the Local processing unit 12 is a register 16 that transmits its data automatically to the intermediate memory 20. The intermediate memory 20 serves for the intermediate storage of information or messages that are intended for the Local processing unit 12. The processing is effected via a local Bus 18 that is associated with the Local processing unit 12. The first intermediate memory 20 is embodied as a first-in-first-out intermediate memory, and is provided, for example, with 256 storage locations for information. The register 16 is embodied in a non-illustrated ASIC.

As a consequence of the addition of messages, a head pointer 22 is increased in the first intermediate memory 20 of the local processing unit 12, and an appropriate head pointer register 24, which stores the head pointer, is associated with the register 16.

The reading-out of the information or message is effected via the software, whereby a Tail pointer 26 respectively follows. The coinciding of Head pointer and Tail pointer indicates that no further messages have to be read.

Messages processed by the Local processing unit 12 lead to the making of a free message location available. The pertaining free message location is made available in a further, third Intermediate memory 28 and can if needed be retrieved by a further Local processing unit or by the host. The pertaining Intermediate memory 28 is embodied in the ASIC and also operates pursuant to the first-in-first-out principle.

Figure 2:
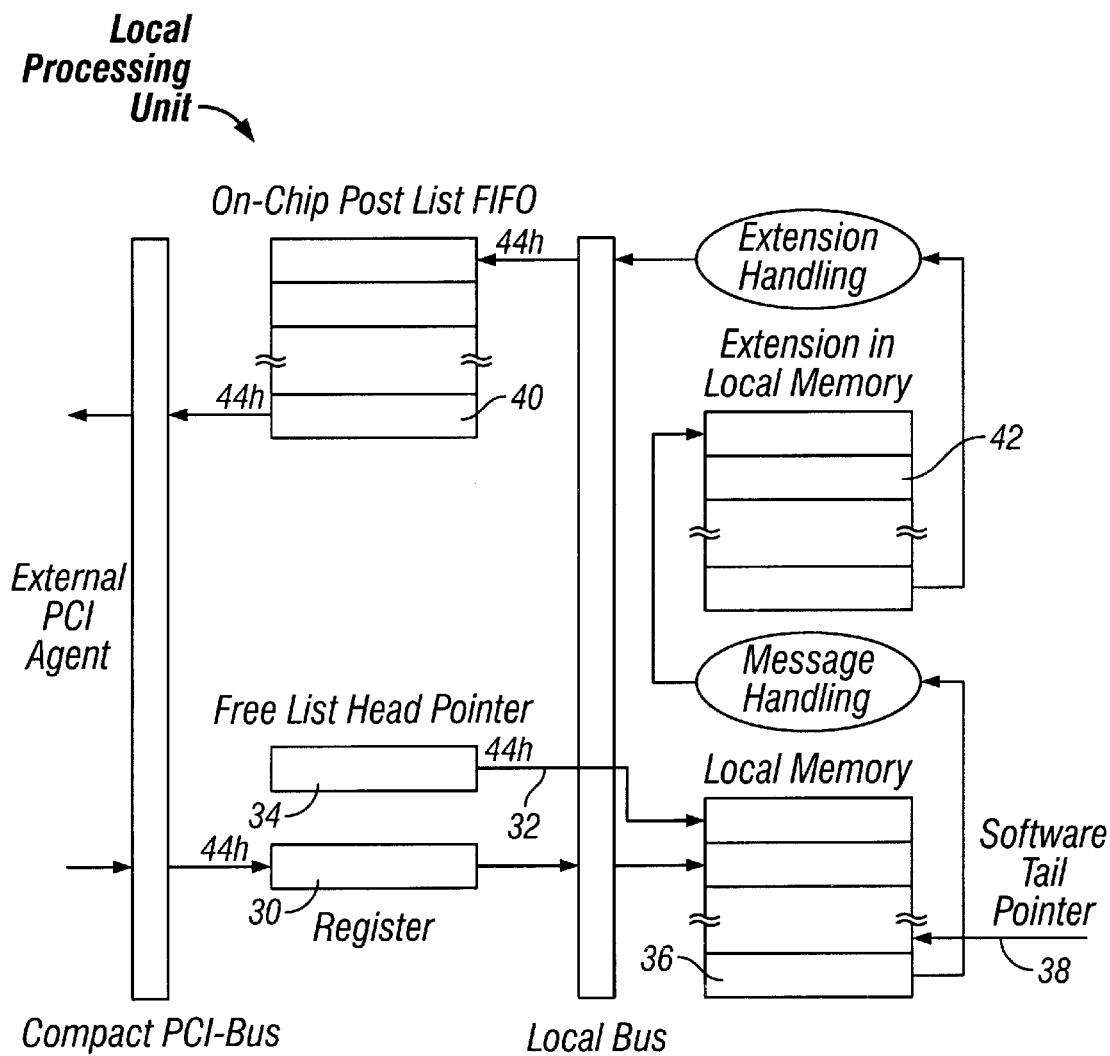
FIG. 2 illustrates a portion of one exemplary embodiment of an inventive computer, namely that portion that is utilized for the intermediate storage of messages that originate from the local processing unit.

From FIG. 2 it can be seen how free message locations are processed by the Local processing unit 12. A Register 30 is provided that feeds the fourth Intermediate memory 36 when data is present. The fourth Intermediate memory 36 also operates pursuant to the first-in-first-out principle. A pertaining Head pointer 32 with a similarly pertaining Head pointer Register 34 points to a storage location in the fourth Intermediate memory 36 that corresponds to the actual position of the Intermediate memory. If free message locations are present, the Head pointer 32 is clearly different from a Tail pointer 38 that indicates the end of the message locations.

If the local processing unit 12 now wishes to transmit a message, a free message location is required, and the tail pointer 38 is correspondingly incremented or increased by 1. For the intermediate storage of the out-going message a second intermediate memory 40 is provided that also operates pursuant to the first-in-first-out principle. The message is deposited in this intermediate memory 40 and is retrieved from the pertaining other local processing unit in a non-synchronous manner, in other words, at a suitable point in time.

A respective intermediate memory extension 42, 44 is provided for the second and third intermediate memories pursuant to the present invention. For messages that are transmitted from the local processing unit, the intermediate memory extension is utilized, with the magnitude of the intermediate memory in turn resulting from the spacing between the head pointer and the tail pointer.

After the intermediate memory 42 is determined in the local memory by the spacing between the head and tail pointers, and hence is not limited to a FIFO register, an overflow and hence a system blockage is to this extent practically precluded.

Pursuant to the exemplary embodiment described here, a local memory is provided in the local processing unit 12, whereby in the local memory there are provided the first intermediate memory 20, the intermediate memory extension 44 on the one hand, and the third intermediate memory 28 and the intermediate memory extension 44 on the other hand.

It is provided to signal the filling state of the third intermediate memory via filling state indicators. For example, for the first and the fourth intermediate memories, filling marks "half full" and "three-quarters full" can be provided, and for the second and the third intermediate memories corresponding filling marks "less than half full" and "less than three-quarters full" can be provided, so that the intermediate memory extension must then finally be activated if such filling states of the intermediate memories are indicated.

The specification incorporates by reference the disclosure of priority document 199 04 084.2 of Feb. 2, 1999.

The present invention is, of course, in no way restricted to the specific disclosure of the specification and drawings, but also encompasses any modifications within the scope of the appended claims.

What we claim is:

1. A computer comprising:
   a plurality of insertion cards that are interconnected via a bus, wherein one insertion card includes a local processing unit and a first intermediate memory for intermediate storage of messages intended for the local processing unit, and a second intermediate memory for intermediate storage of messages originating from said local processing unit, wherein a third intermediate memory and a fourth intermediate memory are provided for free message locations that are intended for or originate from said local processing unit, and wherein said second intermediate memory and said third intermediate memory are each provided with a respective intermediate memory extension in a local memory of said local processing unit.

2. A computer according to claim 1, wherein said second and third intermediate memories are embodied as first-in-first-out memories.

3. A computer according to claim 1, wherein insertion cards correspond to the I$_2$0 standard.

4. A computer according to claim 1, wherein said first and fourth intermediate memories are realized via a head pointer and a tail pointer, wherein upon receiving or giving out messages or free locations for messages, said pointers are respectively automatically incremented or decremented.

5. A computer according to claim 1, wherein said local processing unit contains an interrupt if a message is read into said first intermediate memory or a free message location is given off in said fourth intermediate memory.

6. A computer according to claim 1, wherein said local processing unit, when processing a message that is intended for it, retrieves the message from said first intermediate memory and allocates a free message location to said third intermediate memory after processing the message.

7. A computer according to claim 1, wherein said local processing unit, when giving out a message, conveys this message to said second intermediate memory and uses up a free message location from said fourth intermediate memory.

8. A computer according to claim 1, wherein said intermediate memory extension is preset by a preset address space in said local memory of said local processing unit, wherein said memory extensions are embodied as first-in-first-out memories.

9. A computer according to claim 1, wherein said second and third intermediate memories are connected via a local bus 18 with said local memory, and wherein said bus that connects said insertion cards is a PCI bus, especially a compact PCI bus.

10. A computer according to claim 9, wherein said second and third intermediate memories are provided in an ASIC, and each intermediate memory is provided with a respective connection record for said bus that connects said insertion cards and for said local bus.

11. A computer according to claim 1, wherein the magnitude of said first and fourth intermediate memories is programmable and in particular is disposed between 512 and 216 entries or messages.

12. A computer according to claim 1, wherein said local processing unit comprises at least one local processing unit and is connected via said bus with a host that is free of any of said intermediate memories.

13. A computer according to claim 1, wherein two registers, are provided that are disposed in an ASIC and via which messages can be automatically transferred into associated ones of said intermediate memories.

14. A computer having a plurality of local processing nodes for transmitting and receiving data messages, each processing node comprising:

a local processing unit operable to process data messages;

a first intermediate memory configured to temporarily store data messages received from one of the other local processing nodes;

a second intermediate memory configured to temporarily store data messages received from the local processing unit;

a third intermediate memory including one or more free message locations for temporarily storing free messages intended for processing by the local processing unit; and a fourth intermediate memory including one or more free message locations for temporarily storing free messages originating from the local processing unit, wherein the second and third intermediate memories each have an intermediate memory extension in a local memory associated with the local processing unit.

15. The computer of claim 14 wherein a difference between a fourth intermediate memory head pointer value and a fourth intermediate memory tail pointer value characterizes a number of free message locations present in the fourth intermediate memory.

16. The computer of claim 14 wherein the local processing unit, upon processing a message that is intended for it, retrieves the message from the first intermediate memory and allocates a free message location to the third intermediate memory.

17. The computer of claim 14 wherein the local processing unit, upon providing a message, conveys the message to the second intermediate memory and uses up a free message location from the fourth intermediate memory.

* * * * *

UNITED STATES PATENT AND TRADEMARK OFFICE
CERTIFICATE OF CORRECTION

PATENT NO. : 6,732,213 B1
DATED : May 4, 2004
INVENTOR(S) : Heinz Guenther et al.

It is certified that error appears in the above-identified patent and that said Letters Patent is hereby corrected as shown below:

Title page,
Item [12], United States Patent, replace "Gunther et al." with -- Guenther et al. --.
Item [75], Inventors, replace "Heinz Gunther" with -- Heinz Guenther --.

Signed and Sealed this

Second Day of November, 2004

JON W. DUDAS
*Director of the United States Patent and Trademark Office*